Sept. 8, 1925.
E. E. BENEDICT
COASTER
Filed Sept. 17, 1924
2 Sheets-Sheet 1
1,553,131
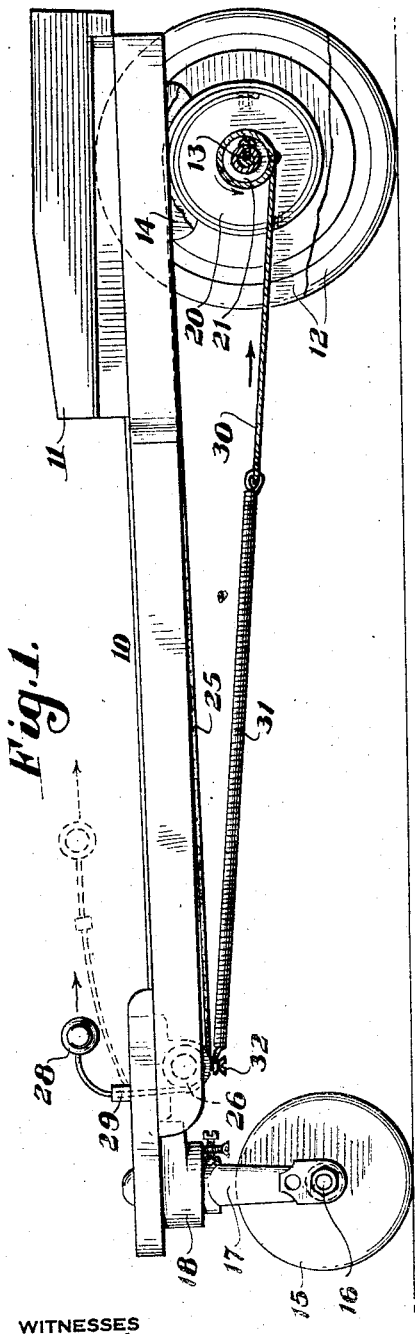
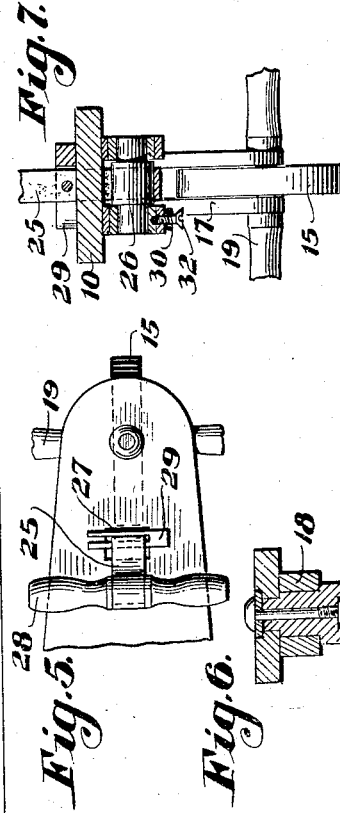
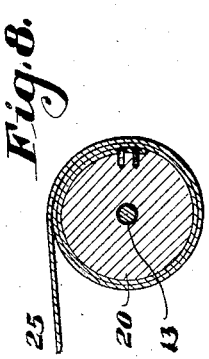
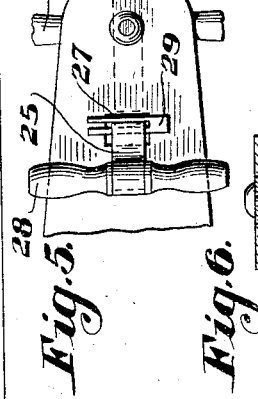
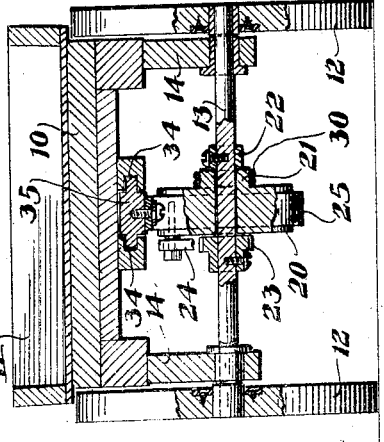
WITNESSES
Louis Goodman
E. N. Lovewell
INVENTOR
E. E. Benedict
BY
ATTORNEY Sept. 8, 1925.  1,553,131

E. E. BENEDICT

COASTER

Filed Sept. 17, 1924  2 Sheets-Sheet 2

WITNESSES

INVENTOR
E. E. Benedict
BY
ATTORNEY

Patented Sept. 8, 1925.

1,553,131

UNITED STATES PATENT OFFICE.

ERNEST ELDRIGE BENEDICT, OF ATLANTA, GEORGIA.

COASTER.

Application filed September 17, 1924. Serial No. 738,183.

*To all whom it may concern:*

Be it known that I, ERNEST E. BENEDICT, a citizen of the United States, residing at Atlanta, in the county of Fulton and State of Georgia, have invented a new and useful Coaster, of which the following is a specification.

This invention relates to a child's vehicle commonly known as a coaster, which is provided with mechanism adapted to be actuated by the rider for propelling the same.

The object of the invention is to provide a vehicle of this type, which is simple and inexpensive in construction, yet practicable and durable and easily operated.

In carrying out the invention, a drum is connected to the traction element by a pawl and ratchet connection, and has a flexible element wound thereon which may be pulled by the rider to rotate and accelerate said traction element, thereby to propel the vehicle. The detailed construction of the invention and its mode of operation will be more fully explained in connection with the accompanying drawings, which illustrate the preferred form thereof.

In the drawings:

Figure 1 is a side elevation of the invention.

Figure 4 is a vertical transverse section through the rear axle.

Figure 5 is a fragmentary plan view of the front part of the vehicle.

Figure 6 is a vertical transverse section through the steering wheel.

Figure 7 is a vertical transverse section through the front part of the propelling mechanism.

Figure 8 is a detail sectional view of the driving drum.

Figure 2:
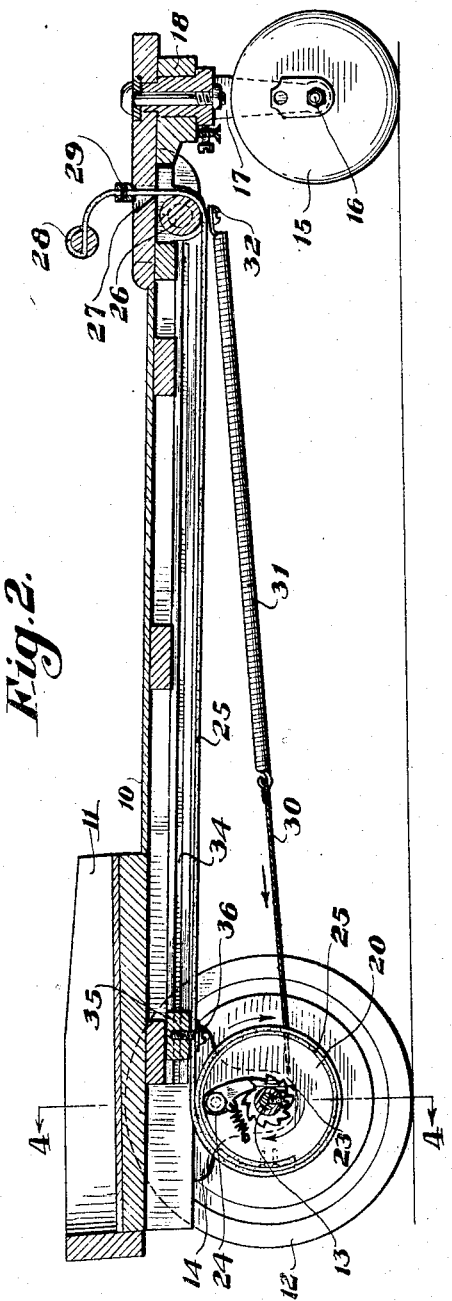
Figure 2 is a vertical longitudinal section of the same.

The invention is illustrated in connection with a coaster having a body 10, provided at its rear end with a seat 11, beneath which are located rear supporting wheels 12 secured to a rear axle 13, which is journaled in suitable bearings 14 attached to the underside of the body. The front end of the coaster is supported by a steering wheel 15, rotatably mounted on a transverse bolt or shaft 16 secured in the arms of a fork 17, which is mounted for rotation in a thrust bearing 18 at the forward end of the body 10. The bolt 16 is extended laterally of the fork 17 a sufficient distance to provide suitable foot rests 19, by means of which the steering wheel 15 may be guided by the rider.

A drum 20 is rotatably supported centrally of the rear axle 13, and a pulley 21 is integrally or otherwise secured to one side of the drum to rotate therewith. The drum and pulley are held against movement longitudinally of the axle by a collar 22 secured to the axle adjacent the pulley 21, and a ratchet wheel 23 secured to the axle adjacent the drum 20. A spring pawl 24, mounted on the drum, cooperates with the teeth of the ratchet 23 to compel the rotation of the axle with the rear or traction wheels 12 when the drum is rotated in one direction, and the pawl rides over the teeth when the drum is rotated in the opposite direction. For the actuation of the drum 20, a strap 25 is secured at one end thereto and normally wound about the same, and extends forwardly about a pulley 26 suitably journaled beneath the forward end of the body 10. The forward end of the strap is passed upwardly through a slot 27, and provided at its extremity with suitably secured handles 28. A stop 29 is preferably secured to the strap near the handles 28, so as to limit the downward movement of the strap, leaving the handles easily accessible.

A cord or flexible wire 30 is secured at one end to the pulley 21, and adapted to be wound about the same in a direction opposite to the strap 25, and the opposite end of the flexible element 30 is secured to a contractile coiled spring 31, which is attached at its forward end, as indicated at 32, to a convenient fixed part of the vehicle.

A pair of parallel longitudinal bars 33 are secured to the under side of the body 10 on opposite sides of the strap 25, and are provided with opposed grooves or channels 34, forming guideways within which the block 35 is slidably mounted. This block is attached, as at 36, to an intermediate part of the strap 25, and serves to guide and support the same as it is pulled to and fro for propelling the vehicle.

Figure 3:
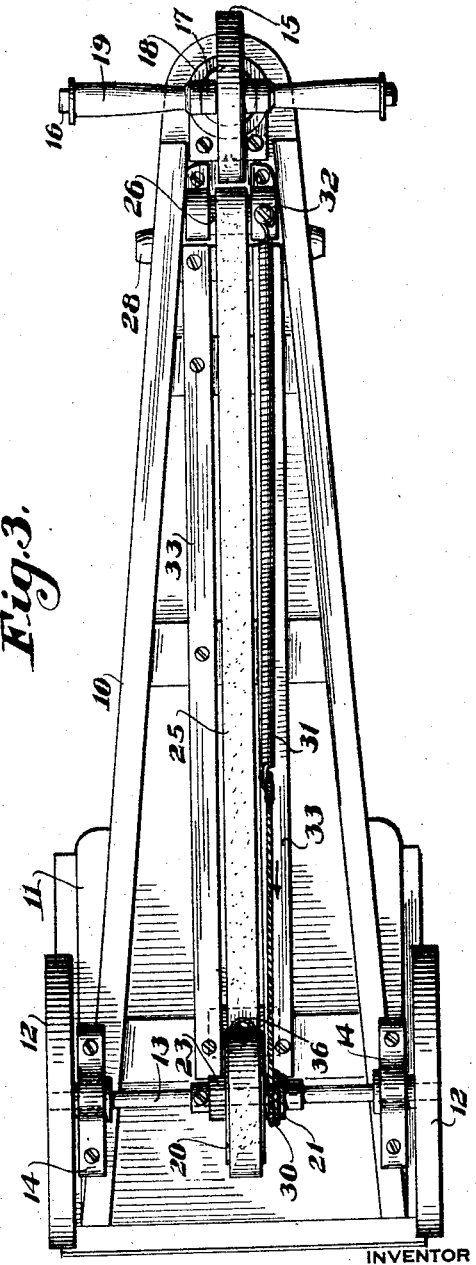
Figure 3 is a bottom plan view.

In the normal position of the propelling mechanism, as illustrated in Figures 1, 2 and 3, the spring 31 is contracted, and the flexible element 30 is unwound from the pulley 21, while the strap 25 is wound about the drum 20. The stop 29 engages the upper sides of the slot 27, and the block 35 is near the rear ends of the guideways 34. In operating the vehicle, the child, sitting on the seat 11 with his feet directing the steering wheel 15, pulls on the handles 28, drawing the strap 25 about the front pulley 26 and up through the slot 27, unwinding the same from the drum 20, and causing the latter to rotate in the direction of the arrow in Figure 2. During this movement, the block 35 is guided forwardly between the parallel bars 33, and the engagement of the spring pawl 24 with one of the teeth of the ratchet wheel 23 causes the forward rotation of the axle 13 and traction wheels 12 to propel the vehicle forwardly. As soon as the pull on the handles 28 is relaxed, the spring 31 contracts, unwinding the flexible element 30, and again winds the strap 25 upon the drum 20. Thus, the parts are set for another forward pull. During the operation of the propelling mechanism, the block 35 is always guided rectilinearly in the channels 34, and serves to hold the strap always in proper position to cause the same to be wrapped neatly about the drum 20, thus preventing the same from becoming tangled, and also preventing its edges from becoming unnecessarily worn or torn.

While I have shown and described the invention in connection with a specific type of vehicle, it will, of course, be obvious that the same is capable of adaptation to other vehicles, and that various other modifications may be made in the details of construction without departing from the scope of the invention as herein claimed.

What is claimed is:

In a device of the character described, the combination with a body, a seat supported thereon, an axle journaled on the under side of said body and supporting wheels fixed to said axle, of a drum loosely mounted on the axle, a pawl and ratchet connection between the drum and axle, a pulley located at one side of said drum and turning therewith and also loosely mounted on the axle, a pair of parallel bars secured longitudinally to the under side of said body and forming a guideway, a block slidable in said guideway, a pulley mounted on the under side of the body at the front end of said bars, the body being provided with a slot adjacent thereto, a strap passed through said slot and around the front pulley and having a handle connected thereto, the intermediate portion of the strap being connected to said block and its rear end being connected to wind about said drum, a flexible element connected to and wound about the first-mentioned pulley, and a spring connecting one end of said flexible element to a fixed part of the body.

In testimony that I claim the foregoing as my own, I have hereto affixed my signature.

ERNEST ELDRIGE BENEDICT.